No. 755,976. Patented March 29, 1904.

UNITED STATES PATENT OFFICE.

EMORY COLVIN WHITE, OF MONTCLAIR, NEW JERSEY.

PROCESS OF PRINTING ON INFLATABLE ARTICLES.

SPECIFICATION forming part of Letters Patent No. 755,976, dated March 29, 1904.

Application filed April 29, 1903. Serial No. 154,847. (No specimens.)

*To all whom it may concern:*

Be it known that I, EMORY COLVIN WHITE, a citizen of the United States of America, and a resident of Montclair, in the county of Essex, State of New Jersey, have invented certain new and useful Improvements in Processes of Printing on Inflatable Articles, of which the following is a specification.

This invention relates to improvements in processes of printing on inflatable articles, such as balloons, Scotch bagpipes, "Happy Hooligans," and other inflatable rubber toys and articles. Although the printing of words, characters, designs, or pictures on such articles would greatly increase their attractiveness and salability, yet it has heretofore been impracticable to print on them, and principally because when a better character, design, or picture is made on such an article in its normal uninflated condition the stretching of the rubber due to the inflation of the article separates the imprint into indefinitely small portions, and thereby destroys its legibility and attractiveness. I have, however, discovered that it is possible to print upon the rubber when it is stretched to the same or substantially the same degree as it will be when inflated and that the imprint is not then distorted or injured by the inflation.

I apply my process in the following manner: I first stretch the rubber envelop of the article to substantially the same degree of expansion as the rubber will have in the inflated article. I effect this stretching of the rubber envelop in any suitable manner, so that the rubber envelop is stretched to substantially the same tension and dimensions as it will have when the article is used, and I prefer to effect the stretching of said rubber envelop by inflating it with air or gas, in which case after it is inflated the nozzle is compressed air-tight and closed, as by tying the nozzle with a piece of twine. The rubber having been stretched, the article is placed on the printing-press and printed on in the usual manner of printing letters and words or designs and pictures, and I find that the imprint may be made as readily and as clearly and legibly on the inflated balloon or other article as on a flat surface, for the slight adhesion of the printing ink or colors to the surface of the balloon or other article at the instant of making the impression prevents the balloon or article from rolling, so as to blur the impression.

When the balloon or other article is collapsed to its normal unexpanded dimensions after being printed on, as for packing and shipment, the imprint assumes the appearance of embossing, the design being more or less distorted; but when the balloon or other article is again inflated to the condition in which it is in use the imprint returns to the proper form and appearance and adds greatly to the attractiveness of the article.

I have not accompanied the foregoing description of my process with drawings of any particular printing-press or of any particular form of balloon or other inflatable article, because the process is not restricted to the use of any particular press or particular inflatable article, and the manner of applying the process will be evident to those versed in the art from the foregoing explanation of the process without drawings or further detailed description.

Now, having described my improvements, I claim as my invention—

1. The process of printing on the elastic distendible envelops of inflatable articles, consisting in first materially stretching the envelop to substantially the same dimensions as it will have when the article is inflated, and then printing thereon, whereby the imprint will return to substantially the same dimensions and form when the article is inflated as said imprint had at the instant of printing.

2. The process of printing on inflatable articles, consisting in stretching the elastic envelop of the article to substantially the same tension and dimensions as it will have in the condition of use by inflating said envelop with a gas, and printing on the inflated envelop, substantially as described.

Signed at New York this 24th day of April, 1903.

EMORY COLVIN WHITE.

Witnesses:
HENRY V. BROWN,
FRANK J. BLETTE.